(12) United States Patent
Kimura (10) Patent No.: US 7,490,004 B2
(45) Date of Patent: Feb. 10, 2009

(54) VEHICLE NAVIGATION APPARATUS AND METHOD OF SEARCHING FOR AND DISPLAYING NEIGHBORHOOD FACILITIES

(75) Inventor: Tsuyoshi Kimura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 722 days.

(21) Appl. No.: 11/001,665

(22) Filed: Dec. 1, 2004

(65) Prior Publication Data

US 2005/0137788 A1 Jun. 23, 2005

(30) Foreign Application Priority Data

Dec. 19, 2003 (JP) ............................. 2003-422884

(51) Int. Cl.
*G01C 21/00* (2006.01)
(52) U.S. Cl. .................... 701/201; 701/25; 701/208; 701/209; 701/211; 340/995.1
(58) Field of Classification Search ................. 701/200, 701/207, 208, 209, 23, 25, 211, 212, 210, 701/201; 340/988, 995.1; 707/E17.018
See application file for complete search history.

(56) References Cited

U.S. PATENT DOCUMENTS 5,911,773 A * 6/1999 Mutsuga et al. ............. 701/200
6,041,281 A * 3/2000 Nimura et al. .............. 701/211
6,067,502 A * 5/2000 Hayashida et al. .......... 701/209
6,128,571 A * 10/2000 Ito et al. .................... 701/201
6,462,676 B1 * 10/2002 Koizumi ................... 340/995.1

FOREIGN PATENT DOCUMENTS

JP 2002-350151 12/2002
JP 2003-130663 5/2003

* cited by examiner

*Primary Examiner*—Gertrude Arthur Jeanglaud
(74) *Attorney, Agent, or Firm*—Brinks Hofer Gilson & Lione (57) ABSTRACT

A vehicle navigation apparatus and a method of searching for and displaying a neighborhood facility are provided for enabling an effective search for a neighborhood facility with a searching range having a directivity according to a user's intention. The vehicle navigation apparatus comprises a display unit, an information input unit for entering information designated by a user, a storage unit for storing map information including information about facilities, and a controller for controlling information sent to or from these components. While a map image is displayed on a screen of the display unit based on the map information, a base point for search and a genre of a facility of interest for search are designated by the user, and a desired searching direction viewed from the search base point is also designated. At this time, the apparatus searches across the map information for facilities which belong to the designated genre and which are located in the designated searching direction to display a result of the search in a list.

16 Claims, 8 Drawing Sheets

FIG.7(a)  SEARCH LEVEL (STAGE 1) : SEARCHING RANGE R

FIG.7(b)  SEARCH LEVEL (STAGE 2) : SEARCHING RANGE RD1

FIG.7(c)  SEARCH LEVEL (STAGE 3) : SEARCHING RANGE RD2

FIG. 8(a)    SEARCH LEVEL (STAGE 1) : SEARCHING RANGE R

FIG. 8(b)    SEARCH LEVEL (STAGE 2) : SEARCHING RANGE RA1

FIG. 8(c)    SEARCH LEVEL (STAGE 3) : SEARCHING RANGE RA2

VEHICLE NAVIGATION APPARATUS AND METHOD OF SEARCHING FOR AND DISPLAYING NEIGHBORHOOD FACILITIES

BACKGROUND OF THE INVENTION

1. Field of the Invention

The present invention relates to a vehicle navigation apparatus and, more particularly, to a vehicle navigation apparatus having a function of searching for facilities located within a surrounding area of a present position of a vehicle when a map image is displayed on a screen of a display device, and a method of searching for and displaying neighborhood facilities using same.

2. Description of the Related Art

A conventional vehicle navigation apparatus is provided with a CPU for controlling the processing associated with navigation, a storage device, such as a CD-ROM or a DVD-ROM, for storing map data, a display device, a global positioning system (GPS) receiver for detecting a present position of a vehicle, a detector, such as a gyro or a vehicle speed sensor, for detecting a present traveling direction and speed of the vehicle, and the like. In such a navigation apparatus, map data including map information regarding the present vehicle position is read from the storage device by the CPU, and based on the map data, a map image covering the present vehicle position and its surroundings is drawn and displayed on a screen of the display device with a vehicle position mark indicative of the present vehicle position superimposed on the screen. The navigation apparatus renders the map image scrollable or the vehicle position mark movable with the map image fixed on the screen as the vehicle travels, thus allowing a user to understand the present traveling situation of the vehicle at a glance.

Generally, the vehicle navigation apparatus has a function of guiding a user or driver to a desired destination (route guidance function) so that the user can easily travel roads to the destination without taking a wrong path. This route guidance function searches for the most appropriate route connecting a starting point (typically, the present vehicle position) to the destination by a simulated calculation, such as the lateral search method or the Dijkstra method, using the map data with the CPU, and the resultant route is stored as a guidance route. The guidance route is displayed on the map image during traveling in such a manner that it is distinguishable from all other roads (for example, by drawing a line in a different color or thickness from that of any other road). Alternatively or additionally, when the vehicle arrives at a predetermined distance from an intersection being approached on the guidance route, an additional guidance map or view of the intersection (an enlarged view of the intersection, an arrow indicative of a direction in which the vehicle is to travel at the intersection, a distance to the intersection, a name of the intersection, or the like) is displayed on the map image being displayed. This function permits the user to understand which road the vehicle is to travel and/or in which direction it is to proceed through the intersection.

While route guidance is being carried out based on such a guidance route function, the route being provided for guidance or the preset destination may often be changed. For example, when the vehicle is intended to stop at a convenience store before reaching the destination initially set, the vehicle navigation apparatus can provide its own "searching function for a neighborhood facility". When the user previously designates a desired genre of facility of interest for the search, this neighborhood-facility searching function causes the navigation apparatus to search for the designated genre of facility which is located within a predetermined distance from the vehicle position (in this case, the convenience store). Then, the searching function causes the navigation apparatus to display on the screen of the display a list including a name of the facility searched for, a distance and a direction (arrow) from the vehicle position to the facility, or the like. If necessary, the apparatus is further adapted to display on the map image a landmark (brand icon, category icon, or the like) indicative of a position of the facility. In searching for the designated genre of facility, the facility search may often be performed while scrolling the map image as required. Such a neighborhood-facility searching function permits the user to understand a positional relationship between the vehicle position and the designated genre of facility located within a surrounding area of the vehicle position. When a desired facility (landmark) is touched on the screen (or selected by an operation of a remote control unit) as needed, information on this facility can also be obtained.

Such a neighborhood-facility search may also be carried out when the vehicle is stopped before the destination is set, as well as when the vehicle is moving along the guidance route as described above. That is, this search can be performed as needed, as long as the map image is displayed with the vehicle position mark being centered on the display screen.

In the conventional vehicle navigation apparatus, when performing the neighborhood-facility search, an area of a circular or rectangular shape or the like is set that covers a cursor position, which is set on the map image as a center point (the present vehicle position when the map image is not scrolled) and its surroundings. The designated genre of facilities included in the area is displayed in a list.

As a technique associated with the foregoing neighborhood-facility search is proposed a vehicle navigation apparatus having a function of searching for a desired genre of facility located within the surrounding area of the present vehicle position serving as a base point for search (in all directions). This navigation apparatus is designed such that a searching range is enlarged in stages until the number of the search operations reaches a predetermined value, and all facilities searched for are superimposed on the map image and displayed together with the search base point within one screen, as disclosed in JP-A-9-292262, for example.

The neighborhood-facility searching function of the above-mentioned known apparatus enables the user to identify the positional relationship between the vehicle position and the designated genre of facility located within the surrounding area.

Such a navigation apparatus, however, is designed to list and display all facilities which belong to the designated genre and which are located within the surrounding area (in all directions) of the cursor position (or the vehicle position) set as the search base point on the map image, disadvantageously failing to perform search refinement. For example, when the user intends to search for only facilities located in a desired specific direction (e.g. on the west side) viewed from the search base point, the navigation apparatus cannot restrict an object of a searching range to only the facility located to the west of the search base point. That is, even if a genre of a facility of interest to be searched for is designated, the designated genre of the facilities located within a predetermined distance from the search base point in all directions are all listed in the prior apparatus, which results in a relatively large number of facilities being displayed on the screen. If a first list displayed on the screen includes a facility of interest, no problem exists. If not, an additional scroll operation with a scroll button or the like is required for displaying a second or next facility list. This forces the user to repeat the scroll operation until the facility of interest is displayed, which inconveniently becomes burdensome.

SUMMARY OF THE INVENTION

The present invention has been accomplished in view of the foregoing problems encountered with the prior art, and it is an object of the invention to provide a vehicle navigation apparatus that enables searching for a neighborhood facility with a searching range having directivity, especially, that allows for effective neighborhood-facility search according to a user's intention, and a method of searching for and displaying a neighborhood facility using same.

In order to solve those prior art problems, according to one aspect of the present invention, there is provided a vehicle navigation apparatus that comprises a display unit for providing guidance information through a screen, an information input unit for entering information designated by a user, a storage unit for storing therein map information including information about facilities, and a controller for controlling input and output of the information into and from the display unit, the information input unit, and the storage unit, wherein, while a map image is displayed on the screen of the display unit with reference to the map information, when a desired searching direction viewed from a base point for search set on the map image is designated by the user, the controller searches for facilities located in the designated searching direction across the map information, and displays a list of the facilities searched for on the screen of the display unit.

Such a vehicle navigation apparatus of the invention is adapted to, perform restrictive search or search refinement for only a facility or facilities located in a specific direction designated by a user when searching for the facility located within the surrounding area of the vehicle position, thereby allowing for a neighborhood-facility search with a searching range having directivity. This can restrict a searching direction, thereby setting a searching range with the desired searching direction, and extract a user's intended facility or facilities from the searching range set. Even if the facility searched for is not viewable on the screen, as long as it is included in the searching range set, an effective neighborhood-facility search can be carried out according to the user's intention.

In the above-mentioned vehicle navigation apparatus, while the same searching direction continues to be designated, the controller may enlarge the searching range in stages according to the duration of the designation, and search for facilities included in the corresponding searching range at every stage of enlargement to display the list of the facilities searched for on the screen of the display unit in real time.

In this case, the searching range is enlarged in stages, depending on the duration the same searching direction continues to be designated, thus searching for the user's intended facility across a wider area over time.

According to another aspect of the invention, there is provided a method of searching for and displaying a neighborhood facility in a vehicle navigation apparatus, the apparatus comprising a map database that stores therein map information including information about facilities, and having a function of searching for a facility located within a surrounding area of a vehicle position when displaying a map image on a screen of a display device. The method comprises the steps of, when a base point for the search and a genre of the facility of interest for the search are designated by a user and then a desired searching direction viewed from the search base point is further designated by the user, searching for facilities located in the designated searching direction from among facilities belonging to the designated genre across the map database, and displaying a list of the facilities searched for on the screen of the display device.

DESCRIPTION OF THE PREFERRED EMBODIMENTS

Some preferred embodiments of the present invention will be described hereinafter with reference to the accompanying drawings.

Figure 1:
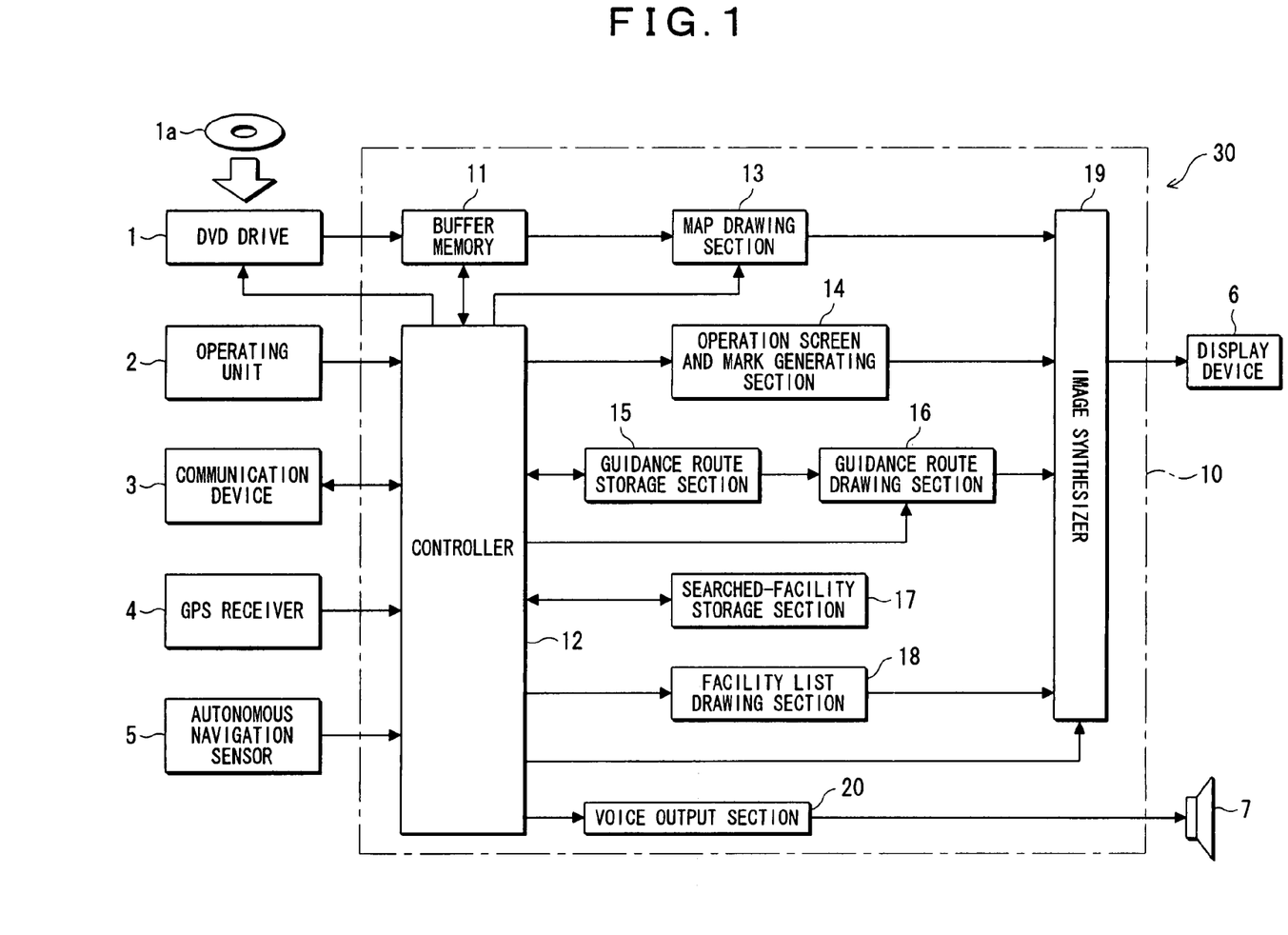
FIG. 1 is a block diagram of a configuration of a vehicle navigation apparatus according to one preferred embodiment of the present invention.

FIG. 1 is a block diagram showing a configuration of a vehicle navigation apparatus according to one preferred embodiment of the invention.

A vehicle navigation apparatus 30 of the present embodiment includes a DVD drive 1 for driving a DVD (DVD-ROM) 1a, which stores therein pieces of map data, each having longitudinal and latitudinal widths of the respective appropriate sizes depending on each scale level ($1/12500$, $1/25000$, $1/50000$ or the like). The map data includes road data for display and for route search, respectively, data concerning various facilities (a convenience store, a supermarket, a discount store, a department store, a gas station, or the like), and so on. The data included in the map data is expressed by a group of coordinates of points (nodes), each point represented by its latitude and longitude. It is noted that, although in the present embodiment the DVD-ROM is used as a medium for recording the map data, the invention is not limited thereto. Alternatively, another storage medium, such as a CD-ROM or a hard disk, may be used.

An operating unit 2 is provided for operating a navigation apparatus body 10, which will be described later. For example, the operating unit 2 can take the form of a remote controller (remote control). This remote controller has various kinds of operating buttons, joysticks, or the like, so as to display various types of menus on a screen of a display device 6, which will be described later, to select a menu or item from among the various types of menus or items displayed on the screen, and to execute the selected item or the like. The joystick has a function associated with the invention, more specifically, serving as a member which is used by a user to designate a desired searching direction viewed from a search base point set on the map image, which will be described below, i.e. a position of a cursor (the present vehicle position when the map image is not scrolled). Tilting of the joystick in a desired direction intended for the search can designate a searching direction.

The navigation apparatus further includes a communication device 3, such as a cellular telephone or an on-board telephone, for communication with various information centers, a GPS receiver 4 for detecting the latitude and longitude of the present vehicle position by receiving GPS signals transmitted from a GPS satellite, and an autonomous navigation sensor 5. This autonomous navigation sensor 5 consists of an angle sensor, such as a gyro, for detecting a traveling direction of the vehicle, and a distance sensor for generating pulses at given traveling intervals. A display device 6 has a screen such as an LCD, and basically provides the user with guidance information associated with navigation on the screen (a map covering a surrounding area of the vehicle position, a vehicle position mark, a guidance route from the vehicle position to a destination, and the like), based on control performed by the navigation apparatus body 10, which will be described below. In addition, the display device 6 displays on the screen additional guidance information about the inventive processing involving the neighborhood-facility search and display of a facility list, which processing is performed by the apparatus 30 as will hereinafter be described in detail. A speaker 7 is used to provide the user with the guidance information about the above-mentioned navigation by voice.

The navigation apparatus body 10 includes a buffer memory 11 for temporarily storing the map data read from the DVD 1*a* via the DVD drive 1, and a controller 12 including a microcomputer and the like. This controller 12 is basically designed to perform various kinds of processing associated with the navigation. For example, the processing involves detecting the present position of the vehicle based on signals received from the GPS receiver 4, calculating the traveling speed of the vehicle based on signals received from the autonomous navigation sensor 5, reading map data intended for display from the DVD 1*a* in the buffer memory 11 via the DVD drive 1, and searching for the guidance route from the vehicle position to the destination under a set condition through use of the map data read from the buffer memory 11. In addition, the controller 12 has a function of controlling the inventive processing including the neighborhood-facility search and the facility list display, which processing is performed by the apparatus 30, as will be explained later.

The apparatus body 10 further includes a map drawing section 13 for performing a drawing procedure of the map image, using the map data read from the buffer memory 11 based on the control performed by the controller 12, and an operation screen and mark generating section 14 for generating various types of menu screens (operation screen) depending on operating conditions, and various kinds of marks including the vehicle position mark, the cursor, and the like. In addition, the apparatus body includes a guidance route storage section 15 for storing therein data about all nodes (coordinates of points, each represented by its latitude and longitude) corresponding to the guidance route searched for by the controller 12 and extending from a starting point to the destination, and a guidance route drawing section 16 for reading data about the guidance route (node columns) from the guidance route storage section 15 based on the control performed by the controller 12 and for drawing the guidance route in a display mode different from all other roads (by using a line of different color or thickness, for example).

The apparatus body 10 further comprises a searched-facility storage section 17 for storing therein the facility or facilities (data) searched for by the controller 12 as will be described later, and a facility list drawing section 18 for performing a drawing procedure of the facility list generated by the controller 12. A genre of a facility of interest for the search is designated via the operating unit 2 by the user and a desired searching direction viewed from a base point for search is also designated by the user, with the map image being displayed on the screen of the display device 6, as will be described below. At this time, the controller 12 searches for facilities located in the designated searching direction, and generates the facility list in such a manner that the facilities searched for are arranged in a predetermined order.

Moreover, an image synthesizer 19 is provided for performing a function of superimposing the guidance route drawn by the guidance route drawing section 16 and the operation screen and various marks generated by the operation screen and mark generating section 14 on the map image drawn by the map drawing section 13 to display them on the screen of the display device 6 under control of the controller 12. The image synthesizer 19 has also a function of displaying on the screen of the display device 6 the guidance information about the inventive processing involving the neighborhood-facility search and the facility list display, which processing is performed by the apparatus 30 as will hereinafter be described in detail. A voice output section 20 provides voice signals (guidance information about the navigation) to the speaker 7 under the control of the controller 12.

In the vehicle navigation apparatus 30 of the preferred embodiment with the foregoing arrangement, the DVD drive 1 (including the DVD 1*a*) corresponds to a "storage unit", the operating unit 2 to an "information input unit", the display device 6 to a "display unit", and the controller 12 to a "controller" respectively.

Figure 2:
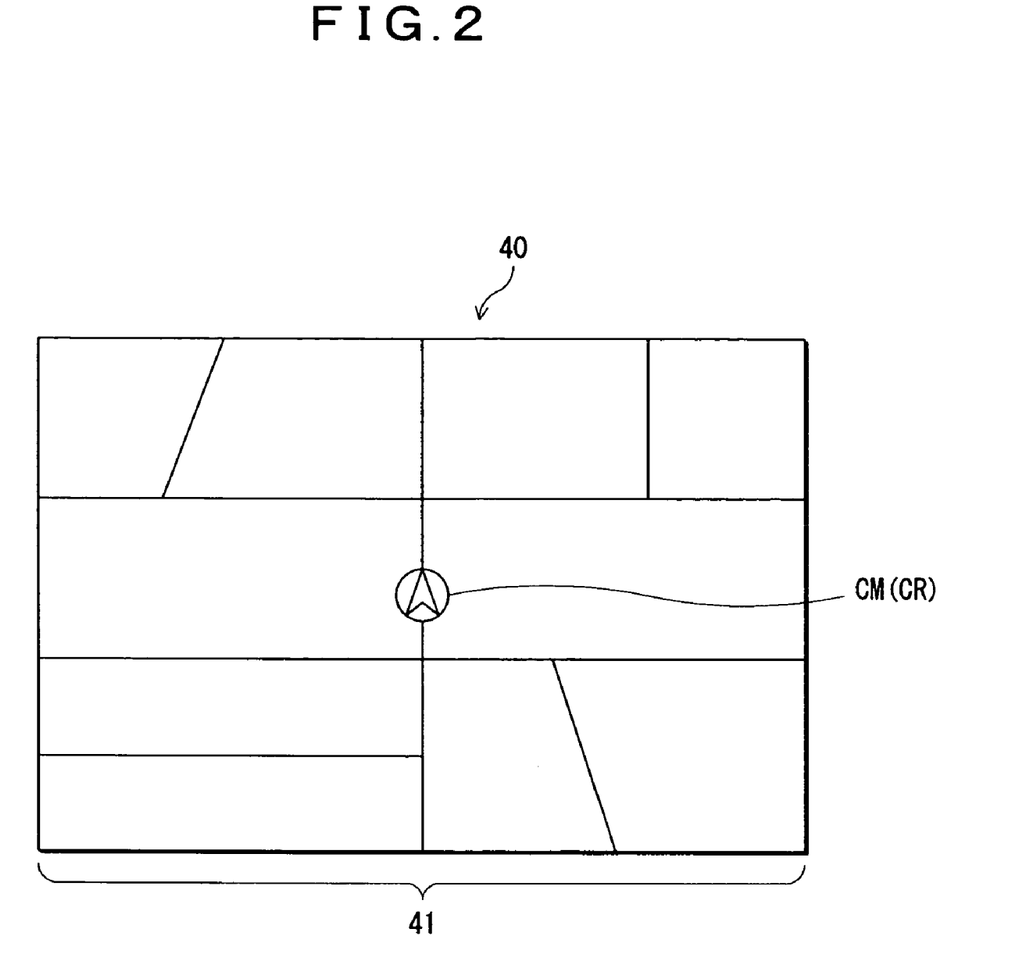
FIG. 2 illustrates an example of a display screen when a map image is displayed.

FIG. 2 illustrates an example of display on the screen when the map image is displayed. In the example shown, a map image 41 with a vehicle position mark (CM) being centered is displayed on a display screen 40 of the display device 6. As shown in the figure, when a scroll operation is not carried out with the map image 41 being displayed, the cursor CR is located at the vehicle position (CM).

Figure 3:
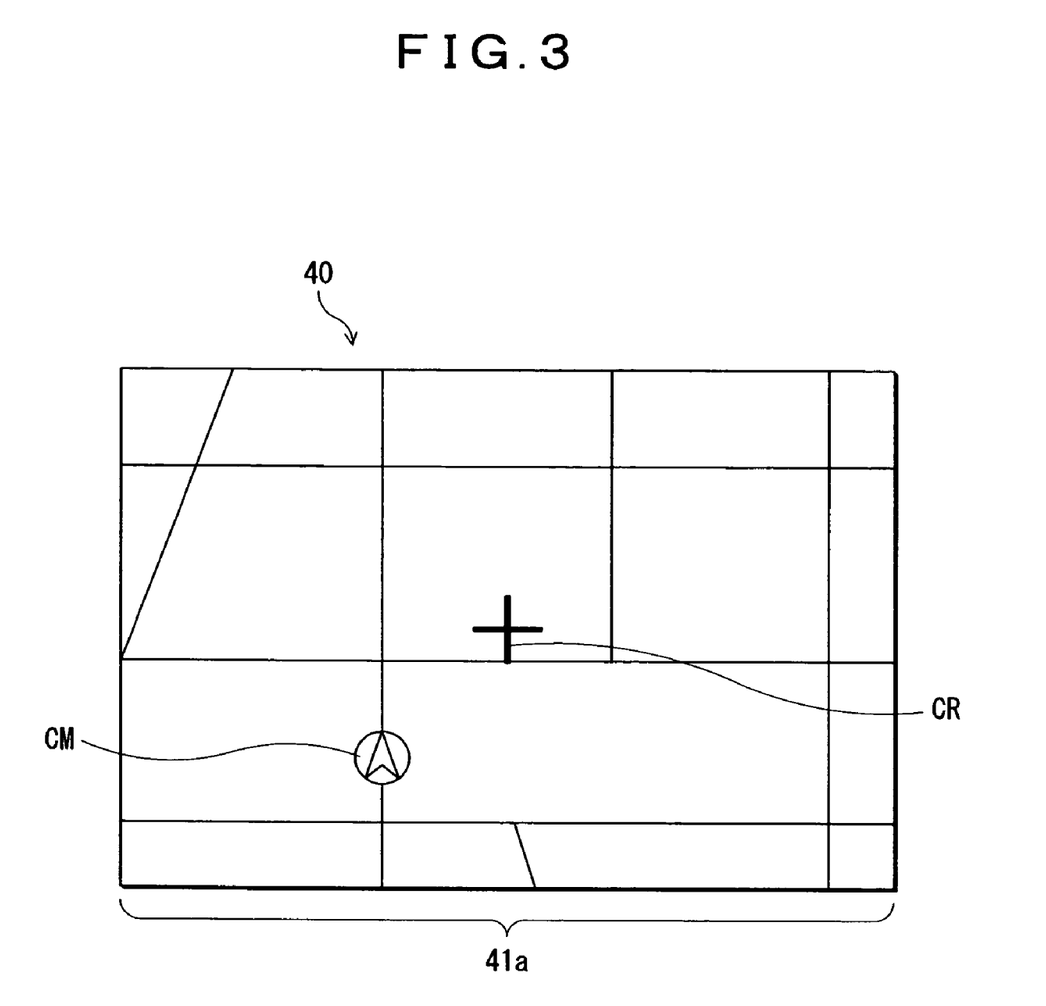
FIG. 3 illustrates an example of the display screen when a search base point is set.

FIG. 3 illustrates an example of display on the screen when a search base point is set. In the example shown, the position of the cursor CR moved on the map image 41*a* by the scroll operation is set as the search base point for the neighborhood-facility search in a condition of the display on the screen (map image 41) shown in FIG. 2.

Figure 4:
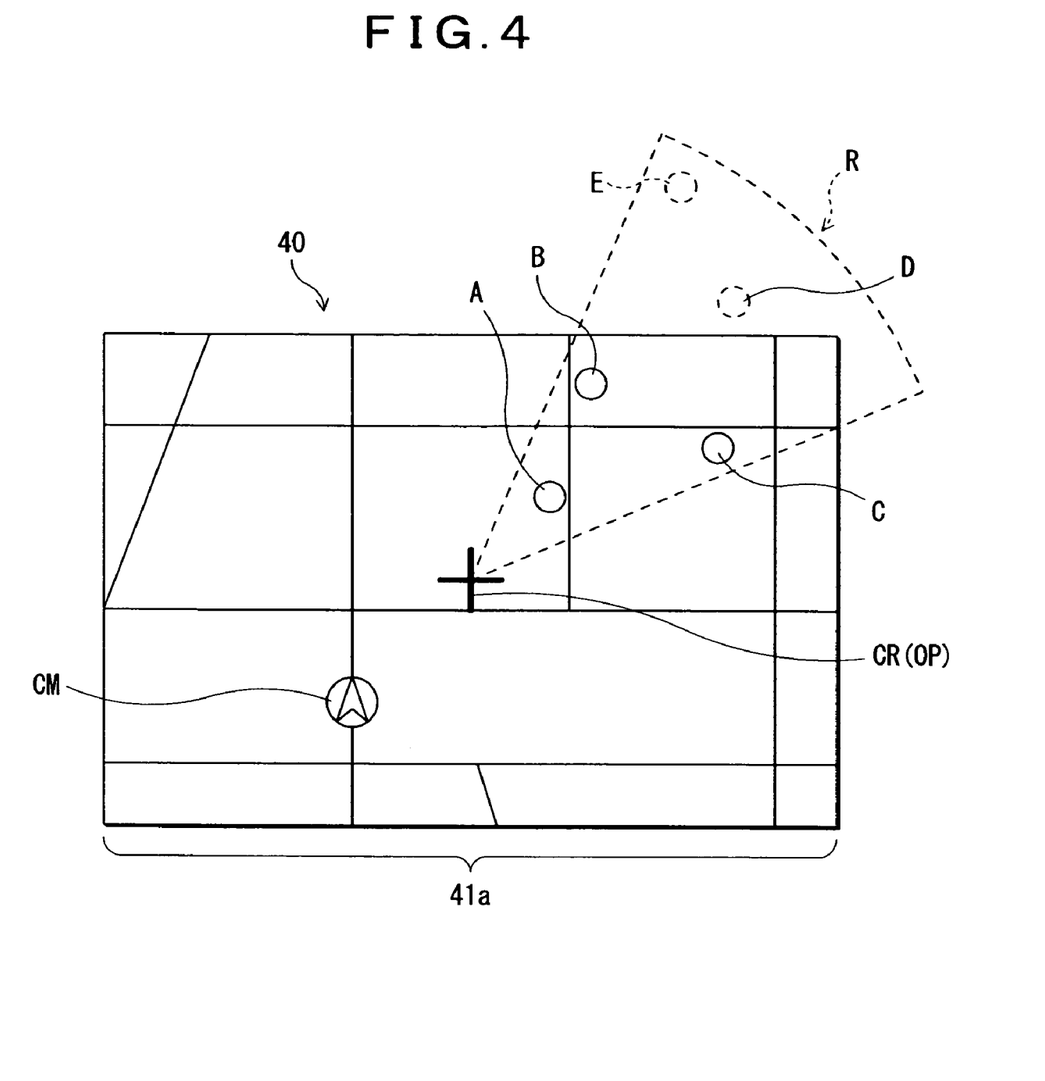
FIG. 4 illustrates an example of the display screen when a searching range is set to be directed in a designated direction.

FIG. 4 illustrates an example of display on the screen when a searching range is set to be directed in a designated direction. In the example shown, a sector form searching range R is set to be directed in a specific searching direction designated by the user (in the example of FIG. 4, in the upper right direction with respect to the position of the cursor CR (search base point OP)) in a condition of the display on the screen (map image 41*a*) shown in FIG. 3. This shows how the searching range R (enclosed by a dashed line) is set by the controller 12. It should be understood that the range is not actually displayed on the image 41*a*. In the example shown in FIG. 4, the searching range R includes five convenience stores which belong to the user's designated genre, i.e. convenience stores A to E. Among them, three convenience stores, for example, stores A to C, are displayed in the form of a landmark, while two convenience stores, e.g. stores D and E, do not appear in the display screen 40.

Figure 5:
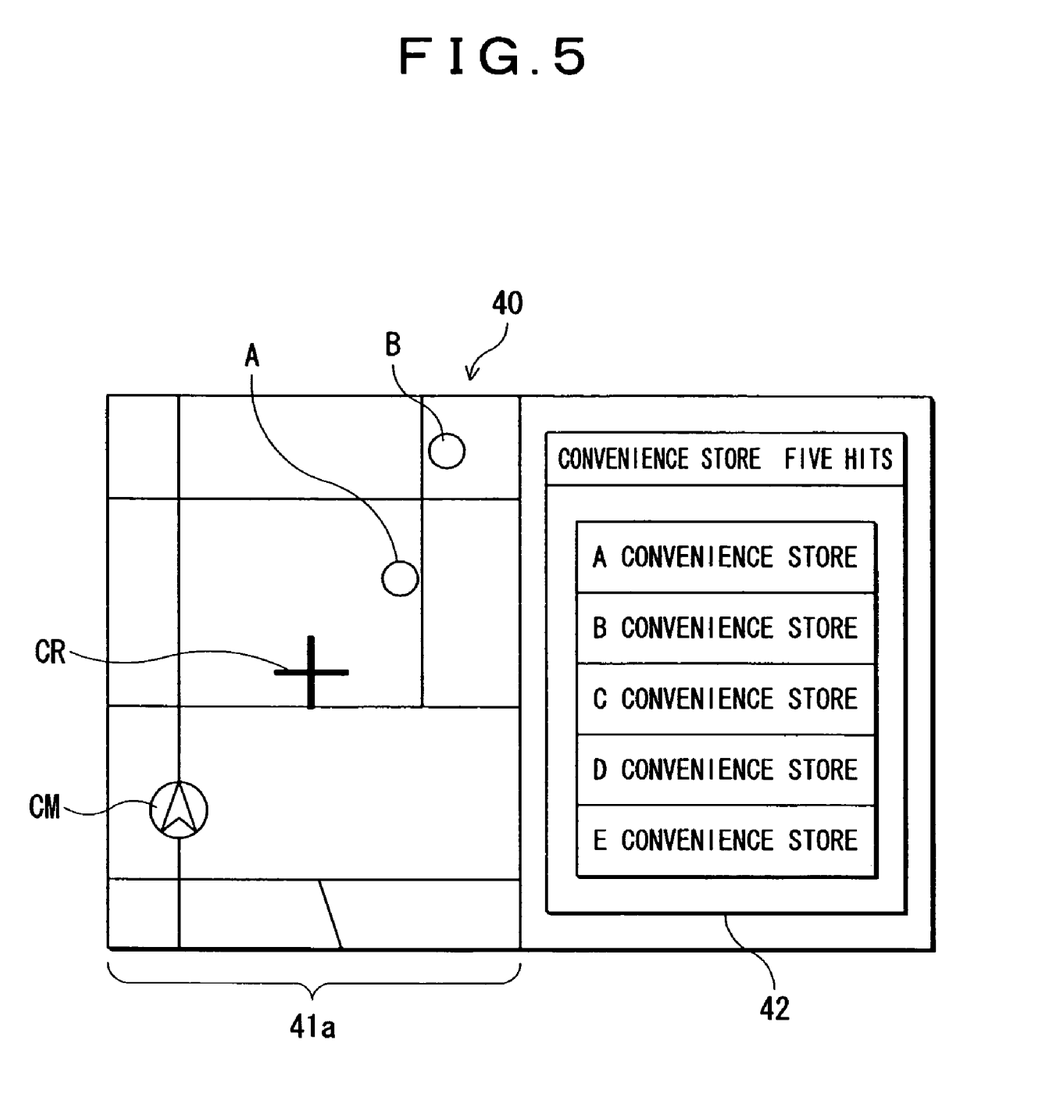
FIG. 5 illustrates an example of the display screen in which a list of facilities searched for across the set searching range is displayed on the screen.

FIG. 5 illustrates an example of display on the screen, especially, in which a list of the facilities searched for across the set searching range is displayed on the screen. In the example shown, the display screen 40 is divided into right and left screen sections. On one screen section (left screen section), the map image 41a is displayed, while on the other screen section (right screen section), a facility list 42 is displayed. Note that, in this case, the display on the left screen section may be switched with the display on the right section. In the facility list 42 is included information indicative of the names (for example, convenience store A, convenience store B, etc.) of the designated genre of facilities (in this case, five convenience stores A to E) searched across the searching range R shown in FIG. 4 as one example. These searched facilities A to E are displayed in the list so as to be arranged in order of increasing distance from the search base point OP (in this case, the position of the cursor CR). In addition, the map image 41a includes the landmarks A and B representing the designated genre of facilities as well as the vehicle position mark CM and the cursor CR. It should be noted that although, in the facility list 42 shown, the number of facilities searched for is five, the invention is not limited thereto. If the number of facilities searched for is equal to or greater than six, all facilities A to E in the list may be selected in a direction from the upper to the lower line in sequence with the cursor or the like. Upon selection of the facility E located on the lowest line, the list is scrolled to display the sixth and later facilities.

Figure 6:
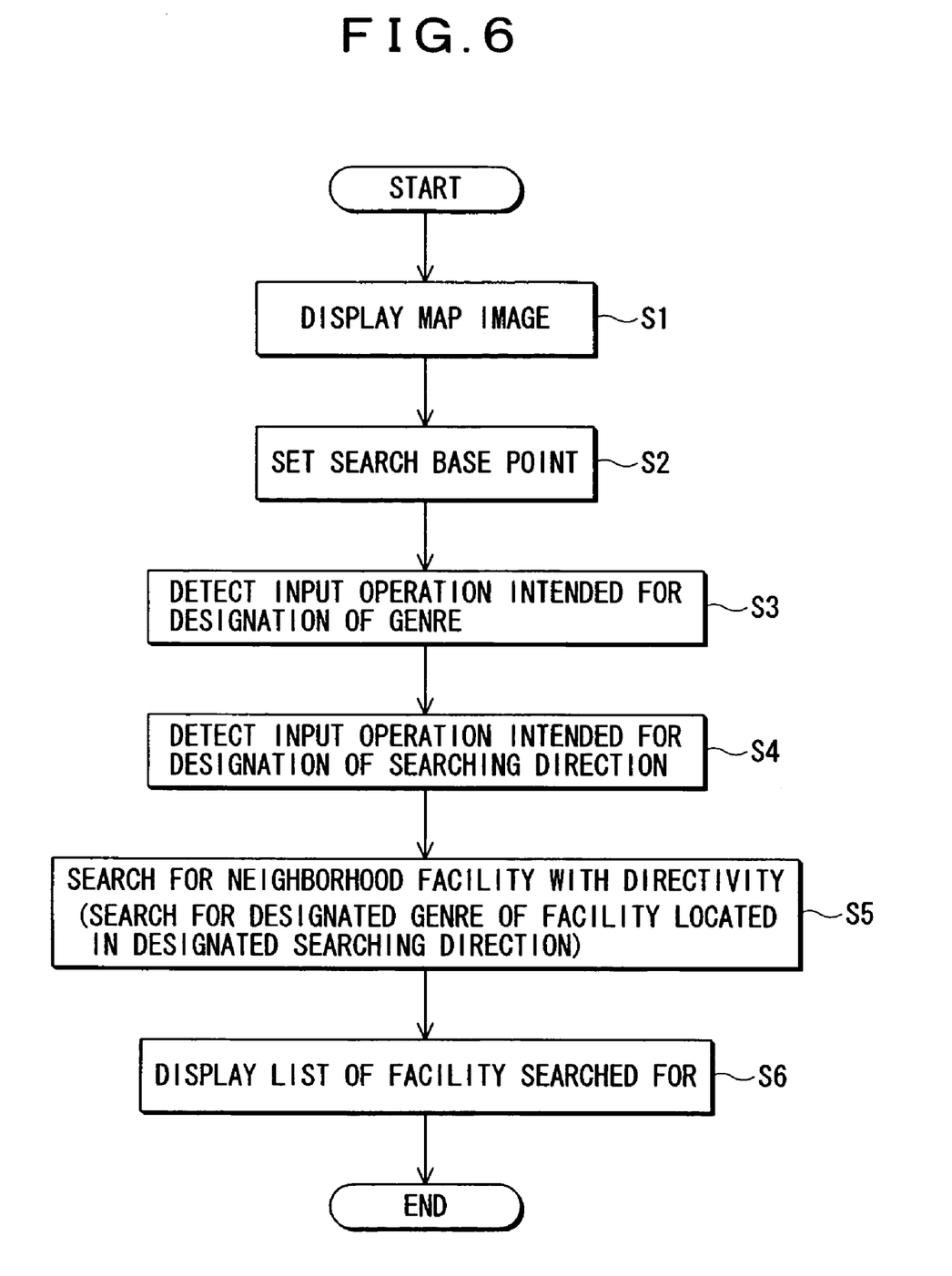
FIG. 6 is a flowchart of processing involving the neighborhood-facility search and the display of the facility list, which processing is performed by the vehicle navigation apparatus of FIG. 1.

Now, the inventive processing of the neighborhood-facility search and of the display of the facility list performed by the vehicle navigation apparatus 30 according to the present embodiment will be described below in detail with reference to FIG. 6 which illustrates an example of a processing flowchart. Note that in the explanation below, a case where the vehicle is stopped before setting a destination is taken as one example. Although the remote controller (operating unit 2) is operated in this case, a similar operation can be achieved, for example, by providing a touch panel on the display device 6 and touching the panel.

First, at a first step S1, when a user manipulates the remote controller (operating unit 2) to select a mode of neighborhood-facility search, the map image 41 with the vehicle position (CM) being centered is displayed on the screen of the display device 6 via the image synthesizer 19, based on control provided by the controller 12, as shown in the screen display example of FIG. 2. At this time, the cursor CR is located at the vehicle position (CM).

At a next step S2, a search base point for the neighborhood-facility search is set on the map image which is displayed on the screen of the display device 6 under the control of the controller 12. That is, as shown in the screen display example of FIG. 3, when the user manipulates the remote controller (operating unit 2) to scroll the screen, the position of the moved cursor CR based on the scroll operation is set as the search base point. When the scroll operation is not carried out, the position of the cursor CR in the case of displaying the map image 41 is as shown in the screen display example of FIG. 2, that is, the vehicle position (CM) is set as the search base point. The set search base point (data) is stored in the buffer memory 11.

Then, at a next step S3, the controller 12 detects an input operation intended for designation of a genre of a facility of interest for search. Specifically, when the search base point is set on the map image, a search menu (not shown) previously having various genres of facilities described therein, according to which the facility is classified, is displayed on the screen of the display device 6, based on the control provided by the controller 12. In this search menu, a plurality of genres (for example, a convenience store, a supermarket, a discount shop, a gas station, or the like) is displayed. When the user manipulates the remote controller (operating unit 2) to select a desired genre (for example, a convenience store), the controller 12 detects that the genre of a facility of interest for the search is designated.

At a next step S4, the controller 12 detects an input operation intended for the designation of a searching direction. That is, when the user manipulates the joystick of the remote controller to designate the desired searching direction viewed from the search base point OP set on the map image (see FIG. 4) (in the example of FIG. 4, the upper right direction with respect to the front side of the vehicle position), the controller 12 detects that the desired searching direction is designated by the user.

Thereafter, at a next step S5, the neighborhood-facility search with directivity is carried out. That is, the controller 12 searches for the designated genre of facility or facilities located in the designated searching direction based on the search base point, with reference to the map data read in the buffer memory 11 and the search base point stored in the buffer memory 11. Specifically, as shown in the screen display example of FIG. 4, a sector form searching range R is set to be directed in the specific searching direction designated by the user, and then all facilities which belong to the designated genre and are located within this searching range R (in the example shown, five convenience stores A to E) are searched for. The data about the facilities searched for is stored in the searched-facility storage section 17.

Finally, at a step S6, the facilities searched for at the previous step are displayed in the list on the screen of the display device 6 via the image synthesizer 19 under the control of the controller 12. Specifically, the facility list 42 is displayed on the screen 40 of the display device in such a manner that the names of the facilities searched for (in this case, convenience stores A to E) are arranged in order of increasing distance from the search base point OP (the position of the cursor CR), with reference to the designated genre of facilities (data) stored in the searched-facility storage section 17 after the search performed by the controller 12, as shown in the screen display example of FIG. 5. Note that, although in the display example of FIG. 5, the screen 40 is divided into right and left sections, one section displaying the facility list 42, the invention is not limited thereto. The list may be displayed on a single screen, not in one of the divided sections.

The facility list 42 is displayed when the designation of the searching direction (the scroll operation of the map image) is completed or stopped by the user. Alternatively, while the same searching direction continues to be designated (the scroll operation of the map image continues), the searching range may be enlarged in stages according to the duration of the designation, and the facility or facilities searched for across the corresponding searching range may be displayed at every stage of enlargement in real time, as will hereinafter be described in detail.

It should be noted that although postprocessing to be performed after the display of the facility list 42 is not shown in detail because it is not related to the spirit of the invention, other variations may be envisaged. For example, by selecting any one of facilities displayed in the list (see FIG. 5), detailed information on the selected facility may be displayed on the screen. In this case, the detailed information may be displayed in a single screen, or in the right one of the divided screen sections as a substitute for the facility list 42. Alternatively, instead of displaying the detailed information about the selected facility, all facilities listed may be superimposed on the map image together with the search base point within a single screen.

Now, the processing performed at step S5 (the neighborhood-facility search with directivity) will be explained below using the processing flowchart of FIG. 6, with reference to FIGS. 7 and 8 which illustrate specific examples.

Figure 7A:
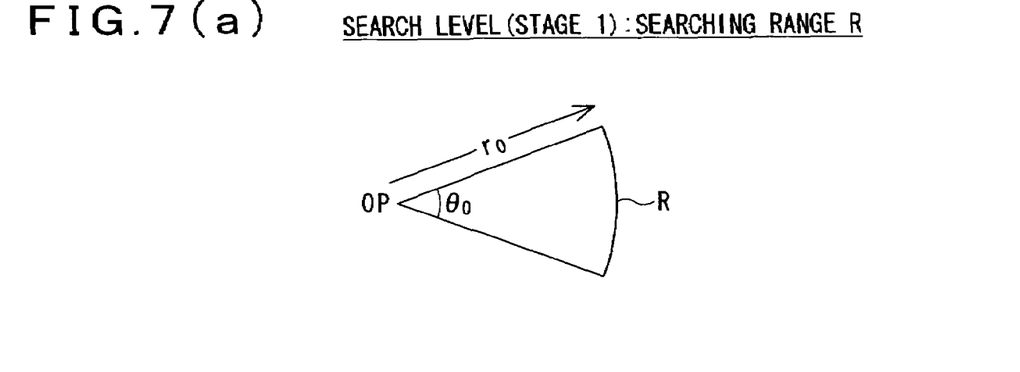
FIG. 7 illustrates a specific example for supplementary explanation of processing at step S5 in the flowchart of FIG. 6.
Figure 7B:
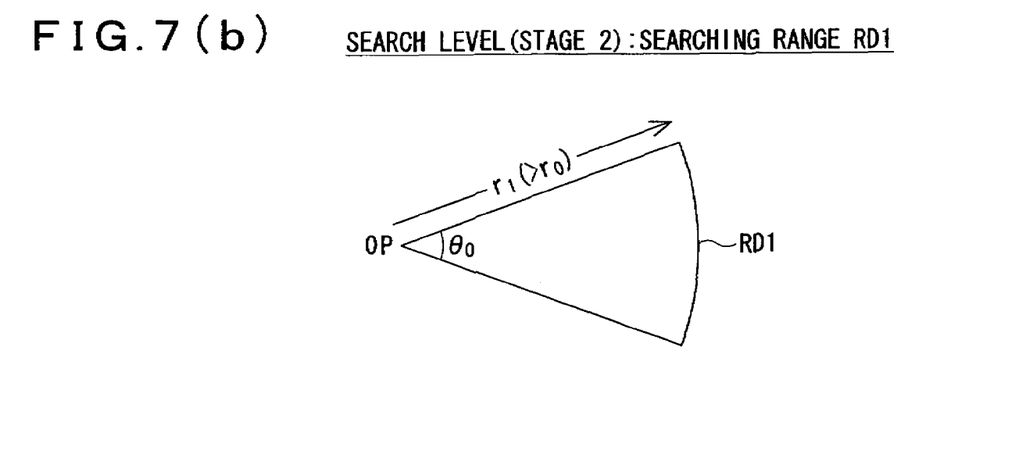
Figure 7C:
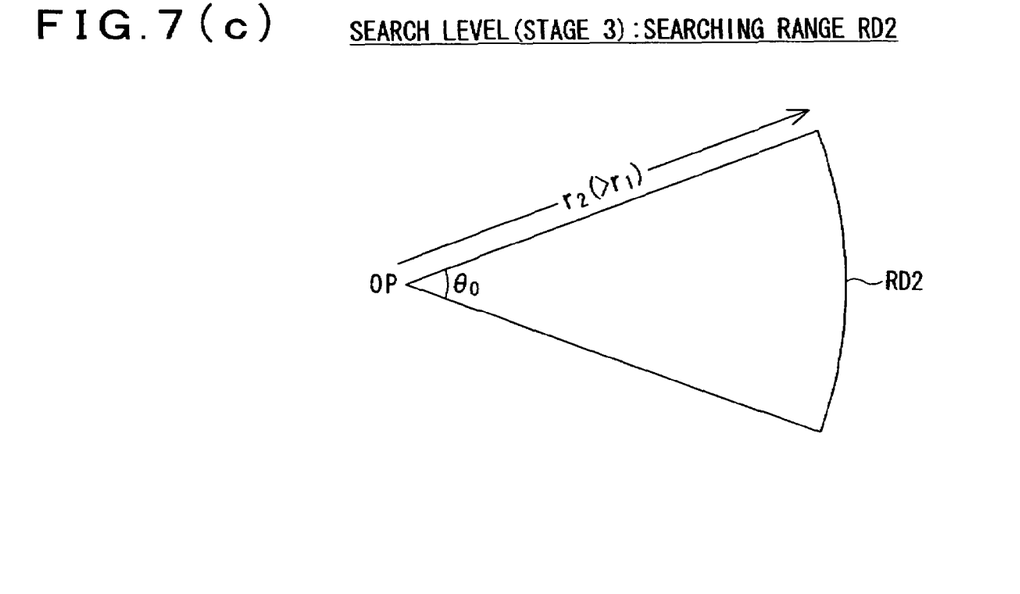

FIG. 7 illustrates an example in which the sector form searching range R (see FIG. 7(a)) set to be directed in the desired searching direction with the search base point OP serving as an origin point (FIG. 4) is enlarged in stages, depending on the duration in which the same searching direction continues to be designated (that is, the scroll operation of the map image continues). In the example shown, under the condition where an angle of the fan shape defining the searching range is maintained constant at $\theta_0$ (e.g. 45 degrees), every time a predetermined time (e.g. two seconds) has elapsed since a starting time of the scroll operation in the given direction, a radius of the sector form range is extended in a stepwise manner, from $r_0$ (e.g. 1 km), to $r_1$ (e.g. 5 km), and further to $r_2$ (e.g. 10 km), so that the searching range is enlarged in stages from R to RD1, and further to RD2.

Figure 8A:
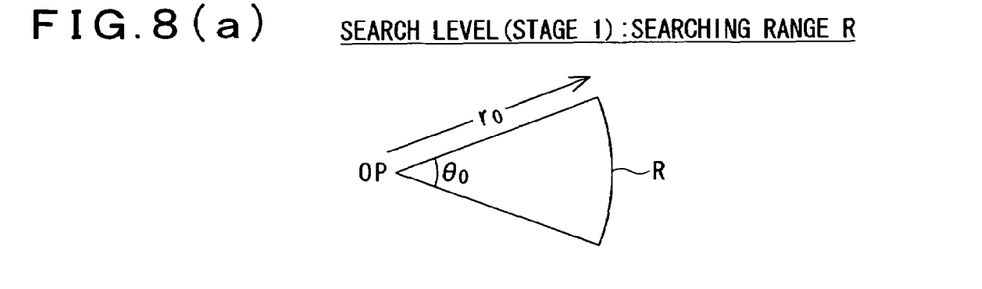
FIG. 8 illustrates another specific example for supplementary explanation of processing at step S5 in the flowchart of FIG. 6.
Figure 8B:
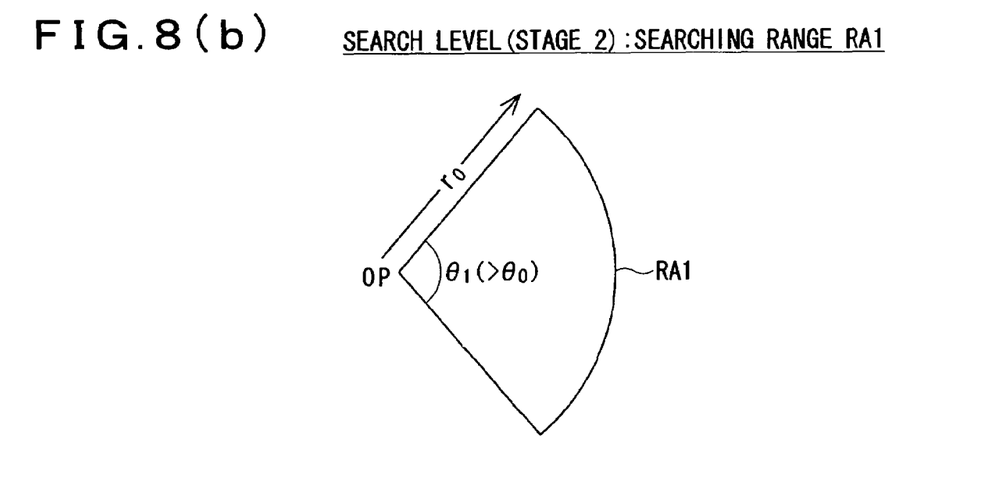
Figure 8C:
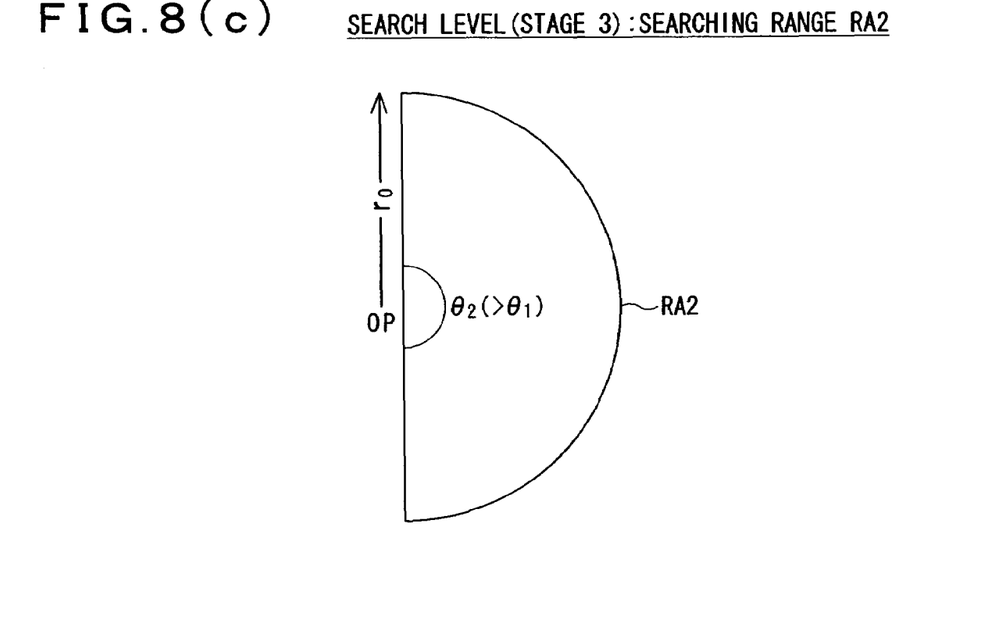

FIG. 8 illustrates an example, as in FIG. 7, in which the sector form searching range R (see FIG. 8(a)) set to be directed in the desired searching direction with the search base point OP serving as the origin point (FIG. 4) is enlarged in stages, depending on the duration in which the same searching direction continues to be designated (that is, the scroll operation of the map image continues). In FIG. 8, however, under the condition where a radius of the fan shape defining the searching range is maintained constant at $r_0$ (e.g. 5 km), every time two seconds, for example, have elapsed since a starting time of the scroll operation in the given direction, an angle of the sector form range is increased in a stepwise manner, from $\theta_0$ (e.g. 45 degrees), to $\theta_1$ (e.g. 120 degrees), and further to $\theta_2$ (e.g. 180 degrees), so that the searching range is enlarged in stages from R to RA1, and further to RA2.

Thus, the "sector form" range, which is defined as the range of search for the user's designated genre of facility located in the desired searching direction, is extended in stages according to the duration in which the same searching direction continues to be designated (the scroll operation of the map image continues), thereby enabling the neighborhood-facility search across a wider range over the elapsed time. Note that when a scrolling direction is changed during the scroll operation, the direction of the "sector form" range is also changed at that time, and then a next neighborhood-facility search is performed again across a new range. The search is discontinued when the scroll operation is stopped, and then its search level is reset to an initial value (stage 1).

As will be seen from the above descriptions, according to the vehicle navigation apparatus 30 of the preferred embodiments, the genre of facility of interest for the search is designated by the user's input operation using the operating unit 2 (remote controller or the like) with the map image being displayed on the screen of the display device 6, and the desired searching direction viewed from the search base point is designated, so that only the restrictive facility search (searching range R of FIG. 4) with the searching direction restricted to the specific designated one is carried out. That is, this provides a neighborhood-facility search with a searching range having directivity. As a result, the user's intended facility or facilities can be extracted from the searching range by restricting the searching direction to the desired one. Even when the facility (in the example of FIG. 4, two convenience stores, namely, convenience store D and convenience store E) does not appear on the single screen, an effective neighborhood-facility search can be performed according to the user's intention as long as it is included within the searching range R.

The "sector form" searching range set by restricting the searching direction to the desired one can be enlarged in stages according to the duration in which the same searching direction continues to be designated (the scroll operation of the map image continues), as shown in FIGS. 7 and 8, thus permitting the user to search for the user's intended facility across a wider range over the elapsed time. This results in an effective neighborhood-facility search.

Note that although a case where the "sector form" range is set as the searching range with the directivity is taken as one example in the above mentioned embodiments (see FIGS. 7 and 8), the shape of the searching range is not limited thereto, as will be seen from the spirit of the invention. For example, the searching range may have an "elliptical shape", a "rectangular shape", a "triangular shape", or the like not shown, with respect to the designated searching direction with the search base point OP serving as the origin point, for example.

The neighborhood-facility search is carried out when the vehicle is stopped before setting the destination in the above-mentioned embodiment. It should be understood that the timing of performing the neighborhood-facility search is not limited thereto. In short, the neighborhood-facility search can be performed as necessary, as long as the map image is displayed on the screen of the display device 6, even when the vehicle is moving along the guidance route after the destination is set.

What is claimed is:

1. A vehicle navigation apparatus with a searching range having directivity comprising:
    a display unit for providing guidance information through a screen;
    an information input unit for entering information designated by a user;
    a storage unit for storing map information including information about facilities; and
    a controller for controlling the input and output of information to and from said display unit, said information input unit, and said storage unit,
    wherein, while a map image is displayed on the screen of said display unit with reference to said map information, when a desired searching direction viewed from a base point on the map image is designated by the user, said controller searches across said map information for facilities located within a searching range having a predetermined shape and directed in the designated searching direction, and displays a list of the searched facilities on the screen of said display unit, and wherein, while the same searching direction continues to be designated by the user, said controller enlarges the searching range in stages according to the duration of the designation and searches for facilities included in the corresponding searching range at every stage of enlargement, to display the list of searched facilities on the screen of said display unit in real time.

2. The vehicle navigation apparatus according to claim 1, wherein said controller searches for facilities which belong to a genre designated through said information input unit, from among the facilities located within said searching range in said designated searching direction.

3. The vehicle navigation apparatus according to claim 1, wherein, when the desired searching direction is designated through said information input unit, said controller sets a sector form searching range with said search base point serving as an origin point, and extends a radius of the sector form range in stages according to the duration of the designation of said searching direction to enlarge the searching range.

4. The vehicle navigation apparatus according to claim 1, wherein, when the desired searching direction is designated through said information input unit, said controller sets a sector form searching range with said search base point serving as an origin point, and increases an angle of the sector form range in stages according to the duration of the designation of said searching direction to enlarge the searching range.

5. The vehicle navigation apparatus according to claim 1, wherein said list is displayed in such a manner that the facilities are arranged in order of increasing distance from said search base point.

6. The vehicle navigation apparatus according to claim 1, wherein, when the designation of the searching direction is stopped, said controller displays on the screen of said display unit the list of facilities searched for across said map information and located within said searching range in said designated searching direction.

7. The vehicle navigation apparatus according to claim 1, wherein said information input unit is a remote controller, which is provided with a joy stick.

8. The vehicle navigation apparatus according to claim 1, wherein said display unit is a display device provided with a touch panel, and said information input unit is said touch panel.

9. The vehicle navigation apparatus according to claim 1, further comprising vehicle-position detecting means for detecting a present position of the vehicle, wherein said search base point is the present vehicle position detected by said vehicle-position detecting means.

10. The vehicle navigation apparatus according to claim 1, wherein, while the same desired searching direction continues to be designated through said information input unit, said controller displays a cursor on said display unit while being capable of scrolling said map image in said searching direction, and wherein said search base point corresponds to the position of said cursor.

11. A method of searching for and displaying neighborhood facilities in a vehicle navigation apparatus with a searching range having directivity, the apparatus comprising a map database that stores map information including information about facilities, and having a function of searching for facilities located within a surrounding area of a vehicle position when displaying a map image on a screen of a display device, the method comprising the steps of:

when a base point for the search and a genre of the facility of interest for the search are designated by a user and then a desired searching direction viewed from said search base point is further designated by the user, searching for facilities located within a searching range having a predetermined shape and directed in said designated searching direction from among facilities belonging to the designated genre across said map database; and displaying a list of the searched facilities on the screen of said display device, the method further comprising, while the same searching direction continues to be designated by the user, enlarging the searching range in stages according to the duration of the designation, and searching for facilities included in said searching range at every stage of enlargement to display the list of the searched facilities on the screen of said display device in real time.

12. The method according to claim 11, wherein said searched facilities are displayed in the list in order of increasing distance from said search base point.

13. The method according to claim 11, further comprising, while the same searching direction continues to be designated by the user, setting a sector form searching range with said search base point serving as an origin point, and extending a radius of the sector form range in stages according to the duration of the designation of said searching direction to enlarge the searching range.

14. The method according to claim 11, further comprising, while the same searching direction continues to be designated by the user, setting a sector form searching range with said search base point serving as the origin point, and increasing an angle of the sector form range in stages according to the duration of the designation of said searching direction to enlarge the searching range.

15. The method according to claim 11, further comprising, when the designation of said searching direction is stopped by the user, displaying on the screen of said display device the list of the searched facilities located within said searching range in said designated searching direction.

16. A method of searching for and displaying facilities in a vehicle navigation apparatus with a searching range having directivity, comprising:

receiving a designation of a base point for a search;

receiving a designation from a user of a searching direction;

searching for facilities located within a searching range having a predetermined shape and directed in said designated searching direction as viewed from said designated base point; and displaying on a display device at least one facility found as a result of said search, wherein said search is conducted substantially within a predefined sector shape oriented in said designated searching direction, and at least one dimension of said sector shape is enlarged in stages according to the duration that said searching direction continues to be designated by the user.

* * * * *

UNITED STATES PATENT AND TRADEMARK OFFICE
CERTIFICATE OF CORRECTION

PATENT NO. : 7,490,004 B2  Page 1 of 1
APPLICATION NO. : 11/001665
DATED : February 10, 2009
INVENTOR(S) : Kimura It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 693 days Delete the phrase "by 722 days" and insert -- by 693 days --

Signed and Sealed this

Sixteenth Day of June, 2009

JOHN DOLL
*Acting Director of the United States Patent and Trademark Office*